INVENTORS
KURT M. KOSANKE
WERNER W. KULCKE
ERHARD MAX

BY [signature]
ATTORNEY

Sept. 29, 1970 K. M. KOSANKE ET AL 3,531,196

OPTICAL REGISTRATION OF AN OBJECT WITH REFERENCE TO A COORDINATE SYSTEM

Filed July 19, 1967 4 Sheets-Sheet 3

Sept. 29, 1970 K. M. KOSANKE ET AL 3,531,196

OPTICAL REGISTRATION OF AN OBJECT WITH REFERENCE TO A COORDINATE SYSTEM

Filed July 19, 1967 4 Sheets-Sheet 4

3,531,196
OPTICAL REGISTRATION OF AN OBJECT WITH REFERENCE TO A COORDINATE SYSTEM

Kurt M. Kosanke, Werner Wolfgang Kulcke, and Erhard Max, Boblingen, Germany, assignors to International Business Machines Corporation, Armonk, N.Y., a corporation of New York Filed July 19, 1967, Ser. No. 654,465
Claims priority, application Germany, July 21, 1966, J 31,372
Int. Cl. G03b 27/32
U.S. Cl. 355—18 15 Claims

ABSTRACT OF THE DISCLOSURE

Apparatus for optical registration of an object with reference to a coordinate system wherein a light path of an image of the object is automatically shifted by electro-optical light deflectors and switches until it coincides in a desired registration with the coordinate system. Thereafter with the adjustment of the light deflectors remaining unchanged, a copy of a suitable pattern is projected through the light deflector onto the object. The image of the pattern is accurately aligned with respect to the coordinate system.

FIELD OF THE INVENTION

This invention relates to an optical system, and more particularly to apparatus for optically and automatically obtaining optical registration of an object with respect to a coordinate system.

DESCRIPTION OF THE PRIOR ART

Various optical registration systems have been proposed for various applications which require repeated projection of given patterns onto predetermined areas of a recoding medium with maximum precision. Typical application is any optical and magneto-optical data storage systems which operate with very high density. Another application requiring such optical registration the manufacture of integrated circuits in the semiconductor technology. Such circuits are fabricated in a number of steps by etching, diffusing, vapor deposition, etc. using a predetermined pattern containing the individual components and conductors which must be placed upon the semiconductor wafer prior to each step with extreme precision. Normally this is done by means of photo-lithographic processes wherein the desired patterns are optically projected onto a photosensitized surface of a semiconductor wafer, after which the photosensitive coating is removed from the unexposed areas.

The electronics in computer industries are presently engaged in miniaturization programs for reducing solid state components to microscopic size. To this end, efforts are being made to manufacture a large number of semiconductor devices from a single wafer of semiconductor material. For example, in one case, several hundred or as many as a thousand transistors having substantially identical dimensional and electrical characteristics are formed from a single semiconductor starting wafer which is about one-half inch to one inch square and which has a thickness of about ten mils. Very small cutaway portions or apertures having 2 x 4 mil dimensions, or less, and junction spacings of about 0.1 mil at the surface of a semiconductor are required for some applications.

In one manufacturing method for producing a large number of integrated circuits on a wafer, it is customary to use masks which have been fabricated to contain portions of the circuit pattern thereon. In general these masks have been fabricated by optical projection of individual circuit portions in predetermined positions with respect to one another on the mask. Another technique, particularly where different circuit portions are to be combined on a wafer, the individual circuit portions are optically projected directly onto the wafer. To this end, for example, a master pattern or object of the desired design is first produced perhaps 50 times the actual size of the final semiconductor element. This pattern is then reduced through conventional photographic reduction techniques to a small pattern of perhaps 20 times actual size. The final mask is then made by a process termed the "step and repeat" method. During this phase a photographic plate or negative is placed in a micro-gauge device and a pattern is projected at 20× reduction thereon only in a first selected area. The pattern is then stepped a specified distance, as again projected onto the plate. In this way, a row of latent images is formed at the plate. The plate is developed, and is then used to form a series of rows in a second plate by similar "step and repeat" operations. An entire matrix or array of images is formed in this manner. When a latent image of the last row has been formed, the plate is developed, and a final plate is derived therefrom with a concurernt reduction to actual size of the final product. In a similar manner, where different circuit configurations are to be combined on a wafer, individual circuits may be projected directly onto the wafer.

Regardless of the method used, as a practical matter it has proven to be difficult to establish images of one mask in the same relative positive position as their related images on another mask of a series, with a satisfactory degree of accuracy e.g. where the deviation of the pattern successfully projected onto the wafer did not exceed one half of a micron from the desired position. For this reason the problem of producing copy position images with maximum precision exists both in the production of the mask and of projected patterns on semiconductor wafers.

However due to the miniaturization of the components, on the wafer, it is necessary that satisfactory methods be provided to meet the ordinary requirements with respect to accuracy required in semiconductor manufacturing.

SUMMARY OF THE INVENTION

In accordance with one object of this invention a non-mechanical system is provided which enables extremely exact registration of various objects with respect to a reference system. In operation the system relies on a reference configuration projected with the image of the object. Generally speaking, the invention includes means by which the image of the object, including a reference configuration such as a reference mark thereon, is projected through electro-optically controlled light deflectors arranged in a projecting beam path onto a plane of a reference coordinate system, as for example, a second reference mark on a master pattern. In operation the system in effect performs a scanning movement caused by suitable control of the light deflectors, whereby, upon the desired registration of the object with the external coordinate system, suitable means is provided to produce a signal which will fix the momentary or coincident position of the deflecting elements to establish a light path for subsequent projection.

The reference configuration for the object to be placed in registry, may take many configurations. For example, a reference mark may be placed on a suitable information carrier which is to be imaged on the object. Alternately the reference mark for the object to be imaged may also be arranged in suitable stationary position as an external coordinate system within the system. For imaging the reference configuration, such as a reference mark, provided of the object itself, a light beam may be employed for illumination of the object in conjunction with a light switch for selective passage of the light beam into the projecting beam path to be established by the electro-optical deflectors. Where required, for example, with photoresist coated semiconductor substrates, the wave length of the illuminating light will be selected to which the photoresist will be insensitive. In the preferred form the light employed for illuminating the object, will be directed to the light switch and light deflectors through a beam splitter, and that portion thereof (which is reflected from the object and passes through the light deflector in the opposite direction) will be deflected at the beam splitter and focused onto a plane containing a coordinate system or a reference mark with which the object to be registered.

The light switch preferably comprises an electro-optical birefringement element which selectively and controllably rotates the plane of polarization of light by 0° or by 90°, and is arranged with suitable inclination which in accordance with its differential indices of refraction, for the ordinary and extraordinary beams, either allows the light beam to pass or reflects it totally. The light deflectors may be comprised of the same elements, as further described below. Other suitable arrangements may also be employed for this purpose, including using Wollaston prisms.

The light reflectors will be comprised of combinations of electro-optical elements for selectively rotating the plane of polarization of light passing them by 0° or 90°, and of birefringement elements for transmitting the light as an ordinary beam or as a deflected extraordinary beam. In the preferred form, the optical thicknesses of the birefringement elements associated with the individual stages of the light deflectors will be respectively doubled over each preceding stage. For achieving a scanning movement of the reflected light beams, the individual stages of the light deflectors acting in coordinate directions, will be activated by control devices which generate pulses having frequencies which are halved from stage to stage.

In accordance with another feature of the invention, the external coordinate reference system may have associated with it photoelectric devices, which, when the light beam reflected by the image of the projected object impinges in proper registry with the reference coordinate system, will produce a suitable signal by which the light deflectors can be arrested and fixed in the respective momentary or coincident adjustments.

In accordance with another feature of this invention, provision is also made for projecting a desired pattern on the object, as for example, in the form of a hologram, which is imaged by means of a coherent light source as a second input to the light switch onto the input plane of the first light deflecting stage. Since in a hologram the interference lines produced by a point are distributed over the entire surface of the hologram, and added advantage is obtained in that any dust particles or other defects on the diapositive will not effect the quality of the image produced on the object. Also it is possible to make the image produced by the hologram position-invariant so that accurate alignment of the diapositive given as a hologram is unnecessary.

In accordance with a further feature of this invention provision is also made for mechanical adjustment. In this manner, a reference configuration of the object and the extrenal coordinate system may include certain patterns moveable into coincidence by rotational movement of the object carrier about the projection axis, which at a point of coincidence or registration, will provide a suitable signal by which the drive mechanism producing the rotational movement will be arrested in its momentary or coincident position.

The foregoing and other objects, features and advantages of the invention will be apparent from the following and more particular description of the preferred embodiments of the invention as illustrated in the accompanying drawings.

DESCRIPTION OF THE PREFERRED EMBODIMENTS

Figure 1:
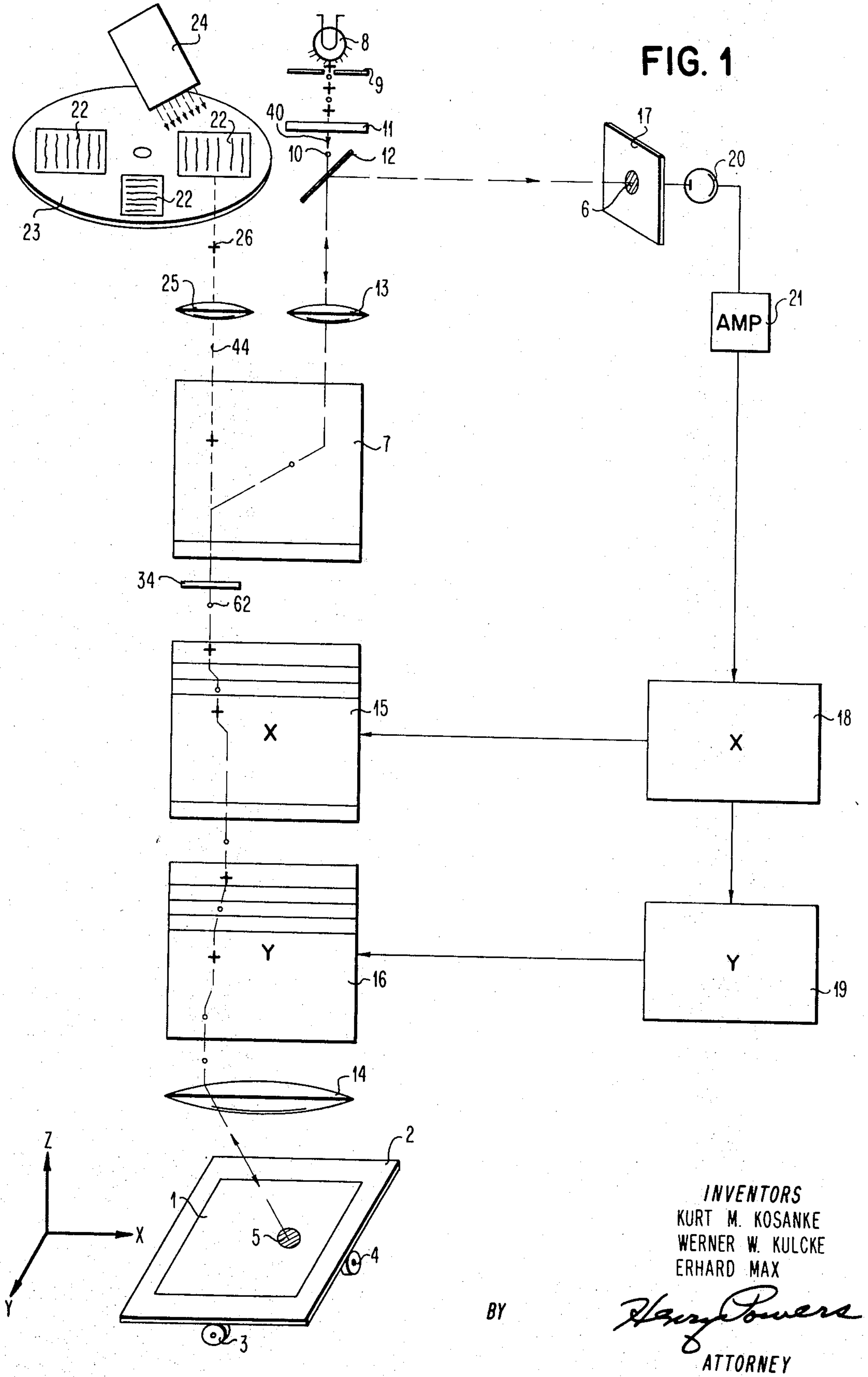
FIG. 1 is a schematic drawing of the invention employed for projecting patterns from masks containing defined portions on an integrated circuit configuration to be formed on the surface of a semiconductor body.

Referring to the drawings and more particularly to FIG. 1, there is shown a wafer 1 of a semiconductor material, such as silicon, on which it is desired to place a large number of different integrated circuit patterns. As will be understood, in the process of fabricating such components, a series of masks, for desired semiconductor components, conductors etc. will be successively interposed between various processing steps employed for forming a desired circuit pattern on selected areas of the surface of a semiconductor wafer. For such purpose, photolithographic processes are conventionally employed wherein the predetermined patterns are optically imaged on the photosensitized surface of the wafer. As will be appreciated, such imaging must be performed with an extremely high precision, and deviations from the desired position should not exceed one half of a micron in the individual steps. In operation the wafer 1 is clamped in position on table 2 and is first adjusted roughly, e.g. with an accuracy of ±7 microns in the X and Y direction, by means of suitable mechanical adjusting means, indicated generally by the adjusting screws 3 and 4. The fine adjustment of the image onto a predetermined area is then effected with electro-optical means, to obtain the desired registration of the wafer in order to obtain a corresponding registration with a reference mark such as reflecting mark 5 on the wafer with respect to a stationary reference mark such as a reflecting mark 6 of the external coordinate system 17 serving as a reference system for the correct registration. After completion of the rough alignment, wafer 1 is then illuminated by selective projection into the beam path by means of the light switch 7, the operation of which is more fuly described below. A monochromatic light beam selected from the light source 8 by a diaphragm or aperture 9 is as indicated by the circles 10 linearly polarized in the polarizer 11 in the direction perpendicular to the plane of the drawing. The wave length of the light emitted by the light source 8 as is apparent, will for such registration be in he spectral regtion to which the layer applied onto the wafer 1 is insensitive. For example the wave length of the emitted light is selected from the red or yellow range, whereas the surface i.e. photosensitized coating, will be sensitive only to ultraviolet light. The light beam from source 8 will then pass through the beam splitter 12 such as a semi-transparent mirror, a beam splitting prism and the like, and the light beam is then directed by means of lenses 13 and 14 onto the area of the wafer containing the reference mark 5. Along its path, the light beam, as indicated above, passes through light switch 7 as well as deflectors 15 and 16 which are employed to deflect the path of the light in the X and Y directions, respectively.

The light reflected by the reference mark 15 will then pass along the same path through the light deflectors 15 and 16 and the light swtich 7 back to lens 13 which produces an image of the reference mark on the coordinate reference system containing the reference mark 6. In passage, the light beam will be reflected at beam splitter 12. However, since the adjustment of a seimconductor wafer 1 in an X and Y direction has been assumed to be rough, the projection of the mark 5 on the plane of the coordinate system 17 will normally not be in register with the external reference mark 6 of the coordinate system 17.

During such misregistration the light deflectors 15 and 16 are activated in such a manner that the light beam carrying the reflected image of mark 5 is displaced in a scanning movement until the image of the mark 5 produced in the plane of the external coordinate system 17 coincides with its reference mark 6. This scanning motion of light deflectors 15 and 16 is actuated by their associated control devices 18 and 19 to be described below. Assume that the reflected light beam comes in register with the external coordinate system 17 i.e. the reference mark 5 of wafer 1 coincides with reference mark 6 of the external coordinate system 17, a photosensitive cell 20, such as a phototransistor, produces a signal which is applied through the amplifier 21 to the control devices 18 and 19 to thereby stop the scanning movement while simultaneously fixing the coincident deflection (momentary position) of the light deflectors 15 and 16. With the adjustment of the light deflectors thus obtained, and after the light switch 7 has been switched to the projecting beam path, the actual projection of the pattern onto the semiconductor wafer can take place.

As shown in the drawings, the patterns 22 to be projected, are mounted on a disc 23 and by rotation of the disc, may be selectively moved into the projecting beam path. These patterns, which may consist of normal diapositives, are, as shown in the instant embodiment, in the form of holograms, i.e. interference patterns contained in a transparent recording medium in which the wave fronts emanating from the object to be imaged are registered. The use of holograms is particularly advantageous since in a hologram the interference lines of a point are distributed over the entire area which prevents deterioration of the image pattern due to dust particles and similar disturbances which may exist in the pattern so as to cause discontinuities in the conductor of the integrated circuits being imaged. Thus, the hologram 22 s placed in a beam path and is radiated with a high-intensity laser light source 24 including a large aperture, which is so mounted at the angle required for image reproduction whereby by means of the lens 25 at the input to the light deflector 15, a real image of the pattern is produced. When reaching the input to the light switch 7, the light emitted by the laser light source is linearly polarized in the direction of the plane of the drawing, as indicated by the dashes 26. This direction of polarization can be obtained by mounting a suitable polarizer, or it may be effected by the internal structure of the laser.

After the wafer has been exposed to the individual circuits, etc., of the patterns, it is removed from the system, i.e. table 2, and subjected to physical processing requirements, i.e. developing, etching, diffusion, etc. Thereafter, if the use of masks is again required, the wafer is again clamped in position on table 2 and again roughly positioned. Then the positioning device resumes its operation until a coincidence of the mark 5 on wafer 1 with reference mark 6 of the external coordinate system is achieved, i.e. the image of wafer 1 is in desired registration with the external coordinate system 17. Due to the large tolerances in the rough mechanical adjustment, there generally will involve a different adjustment of the light deflectors 15 and 16 than that existing in connection with the previous projection.

Figure 2:
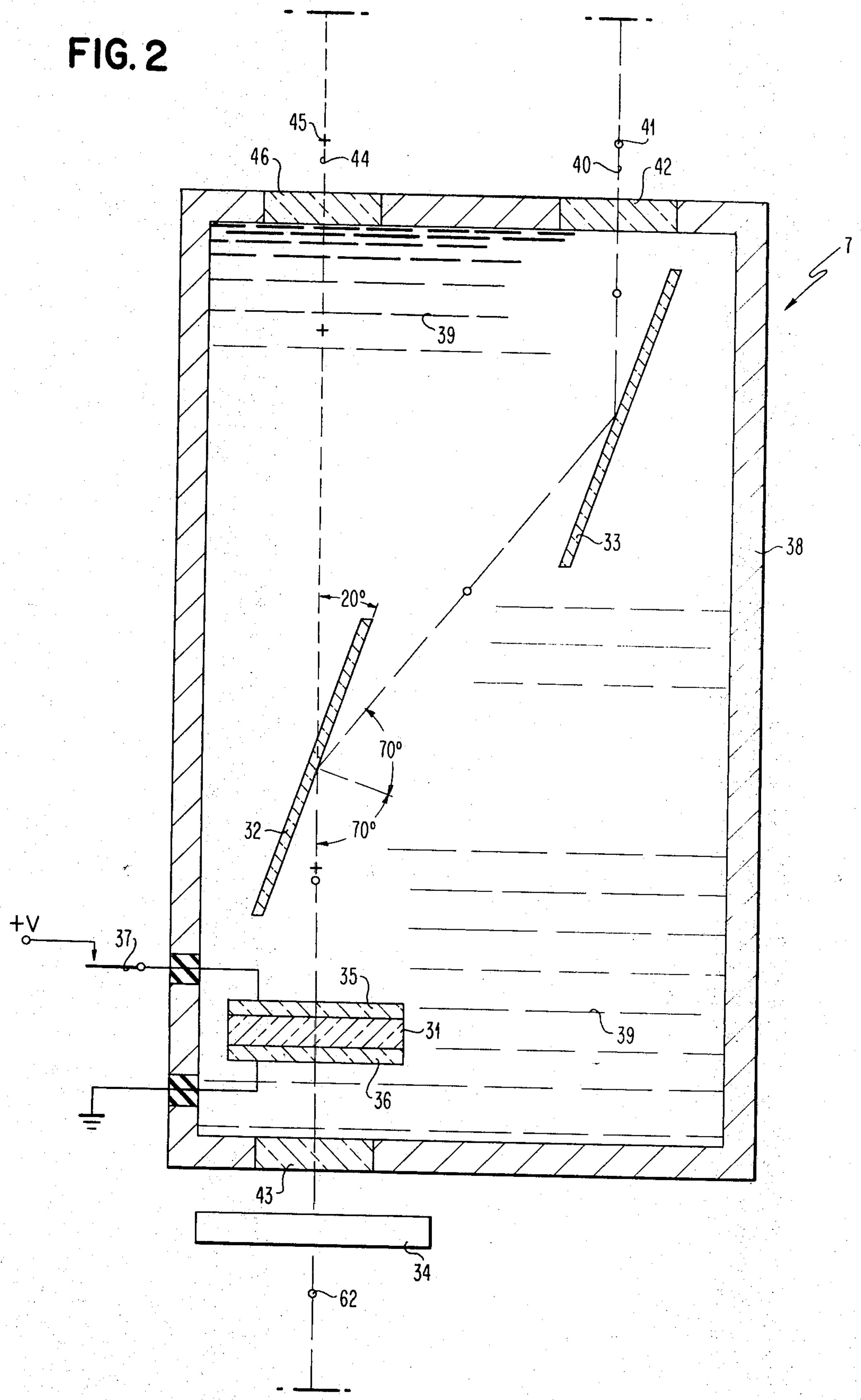
FIG. 2 is a schematic drawing of a light switch for selectively controlling the passage of light into the system from a plurality of sources.

Referring to FIG. 2, there is shown the light switch 7 by means of which the semiconductor may be selectively radiated with the light beams from the adjusting device, i.e. light source 8, or from the pattern to be projected by light source 24. Basically, the light switch comprises an electro-optical element 31, the birefringement plate 32, the reflecting plate 33, disposed in parallel relationship to plate 32, and the polarizer 34. The element 31 comprises a plane parallel-electro-optical crystal, e.g. potassium dihydrogen phosphate, having the transparent electrodes 35 and 36 on respective opposite sides thereof. The electro-optical crystal is designed so that when a voltage V, a so called $\lambda/2$ voltage is applied through switch 37 to the electrodes 35 and 36, the phase shift produced thereby is effective for rotating the plane of polarization of a monochromatic light beam passing through the crystal through an angle of 90°. Typical of the light switches contemplated in this invention is that shown in U.S. Letters Patent No. 2,745,316.

Conversely, if no voltage is applied to the electro-optical crystal 31, the plane of polarization of the passing light beam remains unchanged. The birefringement plate 32, of the embodiment described, comprises a calcite crystal, the optical axis of which extends in parallel to the reflective surface and perpendicularly to the plane of the drawing. In accordance with the characteristics of such crystals, it exhibits two different indices of refraction, viz. $n_o=1.65$ for the ordinary beam and $n_{ao}=1.48$ for the extraordinary beam. The plate 32 is, as shown, mounted at an angle of 20° with respect to the axis of the light beam passing through it, so that the angle of incidence for the extraordinary beam will be 70°, which exceeds the limiting angle of photo-reflection of 63.6°. The reflecting plate 33 is an isotropic material, as for example, potassium floride ($n=1.38$), having an index of refraction which is lower than the index of refraction $n_{ao}$ of the calcite, so that total reflection will occur at its surface. The elements 31, 32 and 33 are contained within a casing 38 which is filled with a dielectric liquid 39 having an index of refraction which corresponds to the index of refraction $n_o$ of the calcite.

The positioning light beam 40 emitted by light source 8 is polarized in a direction perpendicular to the plane of the drawing as indicated by the small circles 41. This beam enters the switch 7 through the window 48, is totally reflected at the plate 33 and reaches the birefringement plate 32 for which it constitutes an extraordinary beam. As a result, the light beam is totally reflected at the plate 32 and passes through the electro-optical element 31, which is not energized and thus allows the beam to emerge through the window 43 without undergoing any change in its plane of polarization.

In the embodiment shown, polarizer 34 is permeable to a beam polarized perpendicularly to the plane of the drawing. If, however, the electro-optical element is energized by applying a suitable voltage the polarization plane of this beam is rotated by 90°, so that it can no longer penetrate the polarizer 34. In this case, however, the switch 7 becomes permeable to the ordinary beam 44 the plane of polarization of which coincides with the plane of the drawing, as indicated by the dashes 45. Thus the beam 45 which comes from the pattern to be imaged, enters through window 46, passes through the birefringement plate 32 without deflection and reaches the electro-optical element 31. Since the latter element is now energized, its polarization plane is rotated by 90° so that it is now able to penetrate and pass through polarizer 34.

Returning to the course of the light beam of reference light source 8, after it emerges from switch 7 it will pass through the deflection units 15 and 16 acting, respectively, in the X and Y directions. These two devices have basically the same structures, and accordingly only the structure of light deflector 15, acting in the X direction will be described hereafter, in conjunction with FIG. 3. The light deflector 15 includes five electro-optical elements designated 51–55, which when energized rotate the plane of polarization of the light beam penetrating them by 90°. Their structure corresponds for all practical purposes to that of the element 31 shown above and described with reference to FIG. 2. The electro-optical elements are respectively, followed by the birefringement elements 56–60 through which the light beam passes (depending on the energization of the electro-optical elements 51–55) either as an ordinary beam or, while being deflected, as an extraordinary beam. The birefringement elements 56–60 are designed so that the element of any given stage is twice the thickness of the corresponding element of a preceding stage, so that with a uniform index of refraction the deflection caused by each element is respectively two times that of the preceding element. The deflection caused in first element 56 lies below the prescribed tolerance limits, e.g. one-half of a micron. Accordingly, with all stages being activated, the maximum deflection will amount to 15.5 microns, a value sufficient to close the gap between the initial mechanical rough adjustment and the desired final accuracy.

Figure 3:
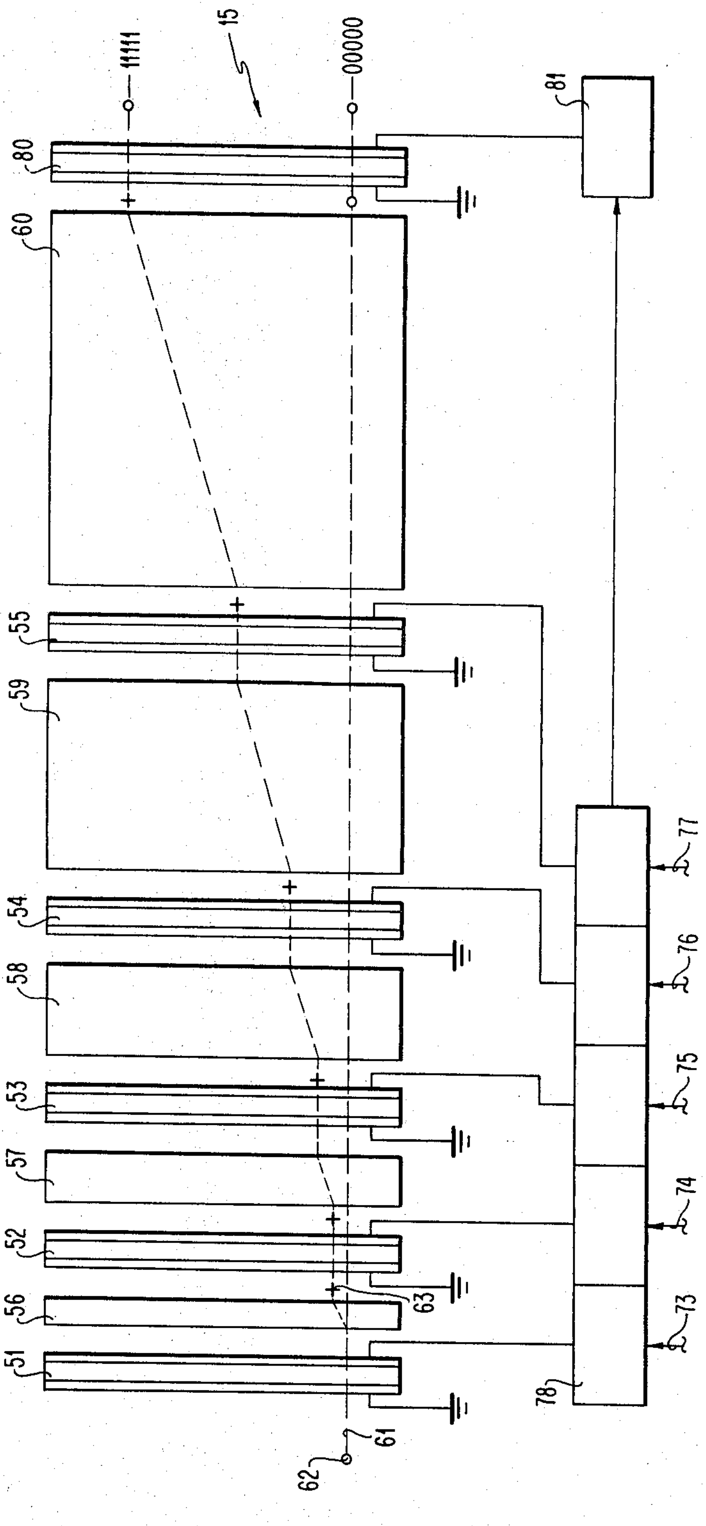
FIG. 3 is a schematic drawing illustrating in detail a light deflector effective for establishing the direction of a light path in an X coordinate.

As shown in FIG. 3 and for purposes of illustration, the light beam 61 entering the deflection unit 15 is polarized perpendicularly to the plane of the drawing as indicated by the small circles 62 and form the ordinary beam with a corresponding orientation of the birefringement crystals 56–60. If none of the electro-optical elements 51–55 is energized the light beam emerges from the device at point "00 000" undisplaced and without change in its polarized condition. However, if for example, only the first electro-optical element 51 is energized, the light beam becomes, as indicated by the dashes 63, an extraordinary beam, which accordingly passes through each of elements 56–60 with deflection and emerges from the device at point "11 111." The same condition applies also to the light beam originating from the reflection of wafer 5 which passes through the deflection device in the opposite direction.

Figure 6:
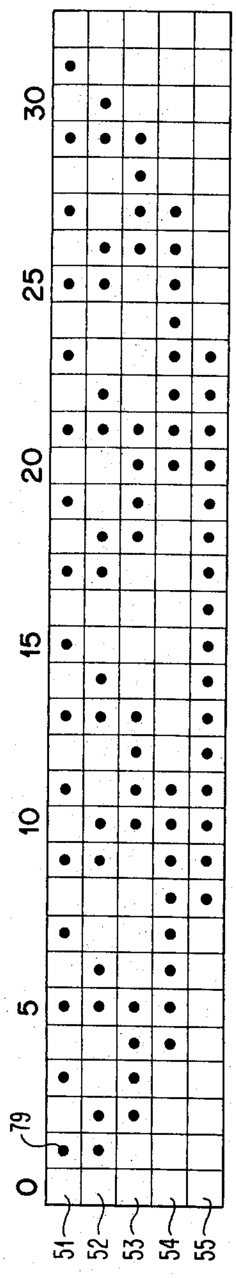
FIG. 6 is a diagram illustrating the energization of the control elements of the light deflectors when receiving the individual pulses applied thereto.
Figure 4:
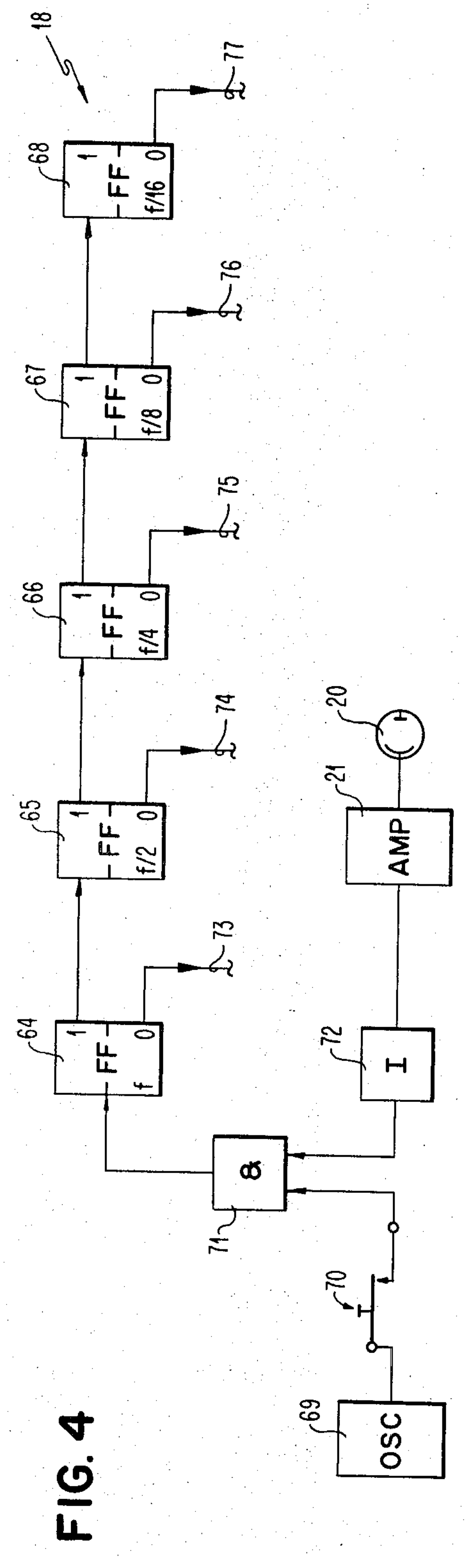
FIG. 4 is a block diagram of a suitable circuit for controlling the light deflector such as illustrated in FIG. 3.
Figure 5:
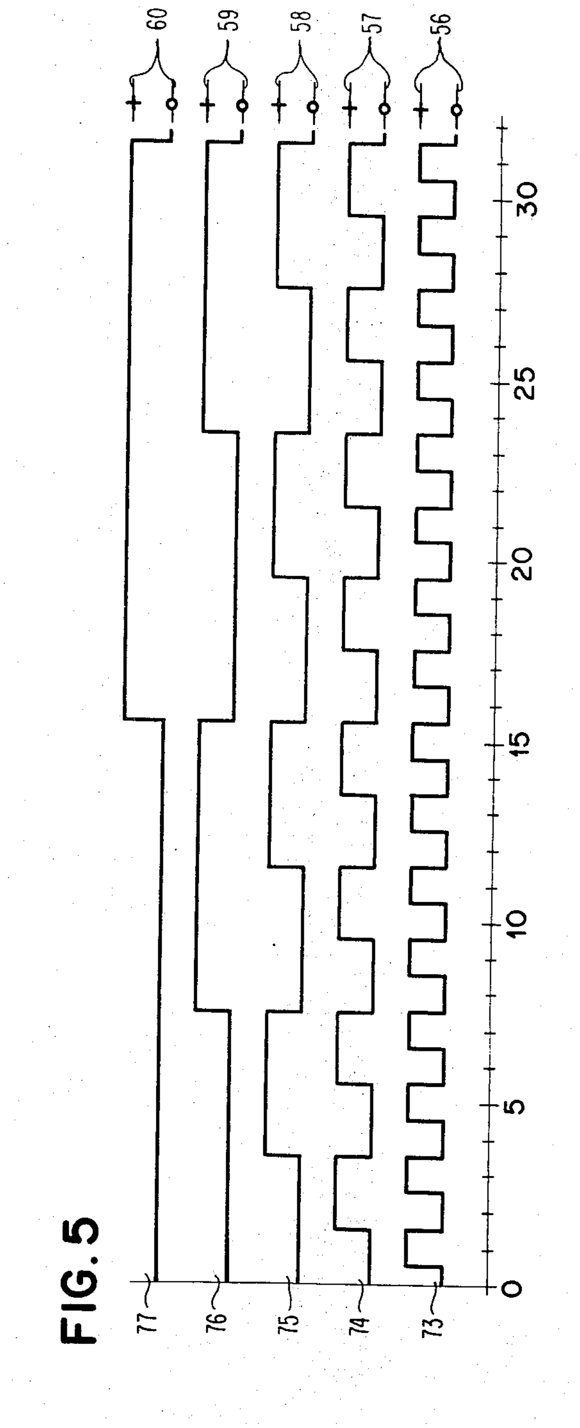
FIG. 5 is a timing diagram of a pattern of pulses by which the system may be controlled, and of the times of operation of the individual stages of the light deflector shown in FIG. 3.

In order to achieve the scanning movement of this light beam in the X direction, the individual stages of the light deflector 15 are successfully activated by control device 18. For this purpose, the control device 18, as illustrated in FIG. 4, comprises five interconnected flip-flops 64–68, the switching frequencies of which are respectively one-half of the frequency of the respectively preceding flip-flop. The flip-flops 64–68 are operated by oscillator 69 through switch 70 and the AND gate 71. These elements are arrested in their momentary position when, the scanning line light beam, projected by wafer 1 comes into desired registry with the external coordinate system so as to activate the photo detector 20 to emit a signal which through amplifier 21 and inverter 72 interrupts the AND gate 71. In operation the outputs 73–77 of flip-flops 64–68 produce a series of pulses as illustrated in the diagram of FIG. 5. These pulses are applied to the individual stages of the light deflector 15 through a logic circuit 78 to which the individual electro-optical elements 51–55 are interconnected, and thus cause the individual deflection stages 56–60, to become activated on the application of a pulse, without effecting adjacent stages. The operation of the logic circuit 78 may be seen in FIG. 6. In operation, e.g. on the application of a pulse "1," as indicated by dots 79, the elements 51 and 52 are energized. In this case, the light beam passes only through the element 56 as an extraordinary beam and is deflected only in this element. When the pulses "15" are applied to the output 73, 74, 75 and 76 only the elements 51 and 55 are energized, causing a deflection in the birefringement elements 56, 57, 58, and 59. As is indicated on the right hand side of FIG. 5, each pulse of the flip-flops corresponds to a deflection in the corresponding stage of the light deflector. By providing suitable delay units between flip-flops, the control device 18 may also be designed so that the pulses of the flip-flops 73–77 shown in FIG. 5, are each shifted half a cycle to the left. In such case, the logic circuit 78 would be unnecessary.

In order to insure that the light beams always leave the deflection unit in their input polarization state, i.e. perpendicular to the plane of the drawing, the electro-optical element 80 is provided at the output of the light-deflector units, this element is operated through the switch 81 in connection with logic circuit 78. The light deflector 16 acting in a Y direction and a control device 19 associated therewith are constructed in the same manner as deflection unit 15 acting in an X direction and a control device 18 associated therewith. By the flip-flops on control device 19, the light deflector 16 is advanced one stage each time after a line has been scanned by deflector 15.

In addition to the adjustment in the X and Y directions, provision may also be made for effecting the fine adjustment of the angular position with respect to the Z axis. In such case, the wafers being processed may be mounted on piezoelectric torsion support. For such alignment, a wafer may be provided with a reference mark suitable for indicating torsional displacements, i.e. periodic lines for producing a moiré pattern. An external reference coordinate system may contain similar lines, whereby a non-parallel superimpositioning of both line fields will result in a characteristic moiré pattern which may be scanned by a plurality of photo-elements. By applying a varying voltage to the piezoelectric support, the angular position of the object may be varied until all of the photo cells emit a signal which will fix the momentary or coincident angular position in the desired imaging position.

While the invention has been particularly shown and described with reference to preferred embodiments, it will be understood by those skilled in the art that various changes in form and detail may be made therein without departing from the spirit and scope of the invention.

What is claimed is:

1. Apparatus for optically registering a projected image of an object with respect to an external reference system, comprising:

means for projecting an image of said object including a reference configuration thereon along a light path;

means interposed in said light path for deflecting said path and to position said image onto desired registration with respect to said external reference system;

means responsive to said registration for fixing the coincident deflection of said light path;

means for holding a copy of a pattern to be projected on said object;

a second means for projecting said pattern along said fixed light path onto said object, wherein said second projecting means comprises a source of polarized light;

a second source of polarized light for projection along and in conformance to said light pattern with said second source of light having a plane of polarization differing from the plane of polarization of the first said source of light; and a light valve means for selectively controlling passage of light from both said first and said second sources along said light path.

2. The apparatus of claim 1 wherein said valve means comprises electro-optical means for controllably rotating the plane of polarization of light from said first and second sources, and including polarized filter means for selective transmitting light of a given polarization.

3. The apparatus of claim 2 wherein said deflecting means comprises a plurality of birefringement elements with said birefringement elements varying in thickness by a factor of two over the preceding stage and operating to pass light polarized in one plane over one path as an ordinary ray and to pass light polarized in a plane normal to said one plane over a different path as an extraordinary ray; and an electro-optical polarizing means disposed on each side of said elements for controllably rotating the plane of polarization of light beams passing therethrough by 90°.

4. Apparatus for optically registering a projected image with respect to an external X–Y coordinate reference system comprising:

means for projecting an image on a photosensitized surface of an object including a reference configuration thereon along an optical path;

light deflecting means including a first electro-optical deflecting means interposed in said light path for deflecting said path and to position said image into desired registration with respect to the X coordinate of said external reference system;

a second electro-optical deflecting means interposed in said light path for deflecting said path and to position said image into desired registration with respect to the Y coordinate of said external reference system;

first control means for said first electro-optical means and responsive to the said registration along the X coordinate for fixing the coincident deflection of said light path along said X coordinate; and second control means for said second electro-optical means and responsive to said registration along the Y coordinate for fixing the coincident deflection of said light path along said Y coordinate.

5. The apparatus of claim 4, including means for illuminating said surface comprising a source of polarized light for projection along and in conformance with said light path through both said first and said second electro-optical means, said light having a wavelength to which said surface is insensitive.

6. The apparatus of claim 5 including a beam splitter means interposed between said source of light and said light deflecting means, said splitter means passing light from said source therethrough and reflecting the projected light on said external reference system.

7. The apparatus of claim 6 including a light valve means interposed between said beam splitter means and said light deflecting means for controlling the passage of light from said source.

8. The apparatus of claim 7 wherein said light valve means comprises electro-optical means for controllably rotating the plane of polarization of incident light; and including polarized filter means for passing light of a given polarization.

9. The apparatus of claim 8 wherein each of said first and second electro-optical deflecting means comprises a plurality of birefringement elements varying in thickness by a factor of two over the preceding stage and operating to pass light polarized in one plane over one path as an ordinary ray and to pass light polarized in a plane normal to said one plane over a different path as an extraordinary ray; and an electro-optical polarizing means disposed on each side of said elements for rotating the plane of polarization of light beams passing therethrough by 90°.

10. The apparatus of claim 9 including means for holding a copy of a pattern to be projected and exposed on said surface; and a second means for projecting said pattern along said fixed light path onto said surface.

11. The apparatus of claim 10 wherein (a) said object comprises a semiconductor substrate; (b) said photosensitized surface comprises a photoresist coating thereon; and (c) said copy comprises a mask pattern for processing of said substrate.

12. The apparatus of claim 11 wherein said copy comprises a hologram.

13. The apparatus of claim 10 wherein said second projecting means comprises a second source of polarized light for projection through said light valve means, and having a plane of polarization differing from the plane of polarization of the first said source of light.

14. The apparatus of claim 13 wherein (a) said object comprises a semiconductor substrate; (b) said photosensitized surfacec omprises a photoresist coating thereon; and (c) said copy comprises a mask pattern for processing of said substrate.

15. The apparatus of claim 14 wherein said copy comprises a hologram.

References Cited

UNITED STATES PATENTS

| | | | |
|---|---|---|---|
| 3,098,416 | 7/1963 | Frankel | 95—4.5 |
| 3,220,331 | 11/1965 | Evans | 355—78 |
| 3,306,176 | 2/1967 | Myers | 355—91 |

JOHN M. HORAN, Primary Examiner

U.S. Cl. X.R.

95—4.5; 355—2